United States Patent [19]

Carpenter et al.

[11] Patent Number: 5,866,517

[45] Date of Patent: Feb. 2, 1999

[54] METHOD AND SPACER FLUID COMPOSITION FOR DISPLACING DRILLING FLUID FROM A WELLBORE

[75] Inventors: Robert B. Carpenter, Allen; David L. Johnson, Dallas, both of Tex.

[73] Assignee: Atlantic Richfield Company, Los Angeles, Calif.

[21] Appl. No.: 666,031

[22] Filed: Jun. 19, 1996

[51] Int. Cl.$^6$ .............................. E21B 43/00; C09K 7/02
[52] U.S. Cl. .................. 507/226; 507/227; 507/228; 507/237; 507/928; 166/291; 166/293
[58] Field of Search ................... 507/226, 221, 507/228, 928, 224, 225, 227, 229, 235, 237; 166/291, 293

[56] References Cited

U.S. PATENT DOCUMENTS

| | | | |
|---|---|---|---|
| 4,083,407 | 4/1978 | Griffin, Jr. et al. | 166/291 |
| 4,176,720 | 12/1979 | Wilson | 166/293 |
| 4,216,022 | 8/1980 | Wilson | 106/104 |
| 4,217,229 | 8/1980 | Watson | 252/8.55 R |
| 4,276,182 | 6/1981 | Beirute | 252/8.55 R |
| 4,322,301 | 3/1982 | Blackmore | 252/8.5 A |
| 4,342,866 | 8/1982 | Kang et al. | 536/119 |
| 4,374,738 | 2/1983 | Kelley | 252/8.5 C |
| 4,423,781 | 1/1984 | Thomas | 166/312 |
| 4,717,488 | 1/1988 | Seheult et al. | 252/8.551 |
| 4,883,125 | 11/1989 | Wilson et al. | 166/291 |
| 4,888,120 | 12/1989 | Mueller et al. | 252/8.551 |
| 4,892,898 | 1/1990 | Leighton et al. | 147/125 |
| 4,915,845 | 4/1990 | Leighton et al. | 210/701 |
| 4,953,620 | 9/1990 | Bloys et al. | 166/293 |
| 4,976,316 | 12/1990 | Carpenter et al. | 166/291 |
| 5,005,646 | 4/1991 | Bloys et al. | 166/291 |
| 5,027,900 | 7/1991 | Wilson | 166/285 |
| 5,030,366 | 7/1991 | Wilson et al. | 252/8.551 |
| 5,038,863 | 8/1991 | Bloys et al. | 166/291 |
| 5,101,902 | 4/1992 | Parcevaux et al. | 166/291 |
| 5,113,943 | 5/1992 | Wilson et al. | 166/291 |
| 5,221,489 | 6/1993 | Bloys et al. | 252/8.551 |
| 5,287,929 | 2/1994 | Bloys et al. | 166/291 |
| 5,292,367 | 3/1994 | Bloys et al. | 106/802 |
| 5,316,083 | 5/1994 | Nahm et al. | 166/291 |
| 5,360,787 | 11/1994 | Bloys et al. | 507/124 |
| 5,458,197 | 10/1995 | Chan | 166/304 |
| 5,547,612 | 8/1996 | Austin et al. | 134/22.19 |
| 5,698,512 | 12/1997 | Austin et al. | 510/475 |
| 5,789,352 | 8/1998 | Carpenter et al. | 507/209 |

FOREIGN PATENT DOCUMENTS

| | | |
|---|---|---|
| 0 171 999 A2 | 2/1986 | European Pat. Off. . |
| 0 271 784 A2 | 12/1987 | European Pat. Off. . |
| 0 430 644 A1 | 6/1991 | European Pat. Off. . |
| 0 590 983 A1 | 9/1993 | European Pat. Off. . |
| 2 077 817 | 12/1981 | United Kingdom . |

OTHER PUBLICATIONS

Dobson, J.W., Jr. et al., Development of a Unique Low Solids, High Density Drilling Fluid System, American Association of Drilling Engineers Drilling Fluids Technology Conference (Houston, Apr. 3&4, 1996).

*Primary Examiner*—Shean C. Wu
*Attorney, Agent, or Firm*—F. Lindsey Scott

[57] ABSTRACT

Spacer fluids comprising a dispersant selected from the group consisting of water soluble polymers comprising allyloxybenzene sulfonate or allyloxybenzene phosphonate polymerized with at least one of acrylic acid, acrylamides, alkyl acrylamides, maleic anhydride, itaconic acid, sulfonated or phosphonated styrene, sulfonated or phosphonated vinyl toluene, sulfonated or phosphonated isobutylene, acrylamidopropane sulfonate or acrylamidopropanephosphonate, vinyl alcohol, sulfonated or phosphonated propene and alkali metal, alkaline earth metal and ammonium salts thereof and water with optional additional components such as surfactants, viscosifiers and wetting materials to form a rheologically compatible spacer fluid for use between a drilling fluid and a cement slurry and a method for using such spacer fluids to displace drilling fluids from a wellbore space with a cement slurry.

22 Claims, 2 Drawing Sheets

METHOD AND SPACER FLUID COMPOSITION FOR DISPLACING DRILLING FLUID FROM A WELLBORE

BACKGROUND OF THE INVENTION

1. Field of the Invention

This invention relates to spacer fluids which are useful in displacing a first drilling fluid from a wellbore space with a second incompatible fluid.

2. Description of the Prior Art

In rotary drilling of wells a drilling fluid, sometimes referred to as a drilling mud, is circulated downwardly through a pipe, sometimes referred to as a drill string, and back up the annulus between the drill string, and the inside of the wellbore. Drilling fluid performs various functions such as cooling the drill bit, maintaining the desired pressure in the well, carrying drill cuttings upwardly through the annulus between the drill string and the wellbore face and the like as well known to those skilled in the art. The drilling fluid can contain many different chemicals but will most often contain a viscosifier such as bentonite. When a casing or liner is to be cemented into the wellbore, any drilling fluid and remnants of the viscosifier present in the wellbore are preferably removed to aid the bonding of the cement between the casing or liner and the wellbore. In removing this drilling fluid from the wellbore and to clean the annulus, a wash or spacer fluid can be introduced ahead of a cement slurry.

Spacer fluids are conventionally used in cementing operations relating to well completion as follows. Drilling fluids and cement slurries are typically chemically incompatible fluids which undergo severe gelation or flocculation if allowed to come into contact. Thus the drilling fluid must be removed from the wellbore annulus immediately prior to cement placement in the annulus. Spacer fluids are pumped between the drilling fluid and the cement slurry to form a buffer between the drilling fluid and the cement slurry, clean the annulus and prevent the drilling fluid and the cement slurry from coming into contact.

Spacer fluids should possess certain rheological tendencies which assist in granular solids removal and which encourage removal of the drilling fluid filter cake from the walls of the well. A common cause of failure in primary cementing is the incomplete displacement of drilling fluids which results in the development of mud filled channels in the cement. These mud filled channels may open during well production permitting vertical migration of oil and gas behind the casing.

Conventional spacer fluids are typically composed of an aqueous base fluid and a weighting agent. The weighting agent is included in the composition to increase the density of the spacer fluid to a desired value and to increase the erosion effect of the spacer fluid on the filter cake clinging to the walls of the well.

The fundamental properties of the aqueous base spacer fluid are typically particle stability and suspension (anti-settling properties), fluid-loss control, favorable rheology, and compatibility with drilling fluids and cement slurries. These properties are directly related to the composition of the spacer fluid.

Consequently a conventional spacer base fluid may include one or more of an anti-settling agent, a fluid-loss controlling agent, a dispersing agent, and a surfactant for obtaining a water wetted surface to aid in cement bonding. The final composition of conventional spacer fluids is typically obtained by adding a weighting agent to the aqueous base spacer fluid to achieve a desired fluid density.

The anti-settling agent and fluid-loss controlling agent may comprise a single component of the composition or may comprise a plurality of components of the composition. The component agents typically are soluble or dispersible in water. Dependent upon the water available at the site and in the geological strata encountered in the wellbore, the aqueous base spacer fluid typically includes fresh water, sea water, brine or an aqueous composition containing one or more dissolved salts such as sodium chloride, potassium chloride, magnesium chloride and calcium chloride. It is preferred that the spacer fluid retain its above mentioned fundamental properties at all possible salt concentrations. Spacer fluids are conventionally used over a wide temperature range from the surface temperature to the bottom hole circulating temperature in a wellbore. The bottom hole circulating temperature may be 200° C. or higher in the case of certain geothermal wells. The term "anti-settling properties" refers to the capacity of the spacer fluid to keep the weighting agent particles in stable suspension throughout the cementing operation which may typically last from about 1 to about 4 hours or longer. A spacer fluid is considered to have good fluid loss control properties if the fluid loss measured according to API specification 10, Appendix F is less than 100 milliliters/30 minutes and excellent if the fluid loss is less than 50 milliliters/30 minutes. Favorable rheology for a spacer fluid requires that the fluid has minimum friction pressure while maintaining adequate suspension of solids. Since the spacer fluid is to be pumped between the drilling fluid and the cement slurry for removing and replacing the drilling fluid in the well annulus, it is very important the spacer fluid be as compatible as possible with both the drilling fluid and the cement slurry.

The compatibility of a spacer fluid with a drilling fluid and a cement slurry is determined in the laboratory by studying the viscosity of binary or ternary mixtures of spacer fluid with the drilling fluid and/or cement slurry varying over the range of 0 to 100 percent by volume for each component of the mixture. Such compatibility in the past has been difficult to obtain primarily because the drilling fluid and the cement slurry are incompatible fluids.

The compatibility of the spacer fluid with the drilling fluid and the cement slurry is considered to be excellent if the viscosity of a mixture of the spacer fluid and the drilling fluid or the cement slurry at a given shear rate and temperature is equal to or less than the viscosity of the more viscous component of the mixture at the same shear rate and temperature. Likewise, the viscosity of a mixture of all three components is considered to excellent if it is less than or equal to the viscosity of the most viscous component at the same shear rate and temperature.

Conventional spacer fluid compositions do not usually demonstrate good compatibility with mixtures of drilling fluids and cement slurries while simultaneously possessing good rheological fluid loss control and anti-settling properties over the entire range of shear rates and temperatures normally encountered in oil field services.

Spacer fluids using sulfonated styrene-maleic anhydride copolymer (SSMA) have previously been used. Such spacer fluids are disclosed in U.S. Pat. No. 5,030,366 "Spacer Fluids" issued Jul. 9, 1991 to Wilson et al; U.S. Pat. No. 5,113,943 "Spacer Fluids" issued May 19, 1992 to Wilson et al; and U.S. Pat. No. 5,292,367 "Dispersant Compositions for Subterranean Well Drilling and Completion", issued Mar. 8, 1994 to Bloys et al. These patents disclose spacer fluids containing dispersing materials which have many of the desired properties of spacer fluids. These patents are hereby incorporated in their entirety by reference.

The preferred dispersants disclosed in these patents are sulfonated styrene-maleic anhydride copolymer (SSMA) and sulfonated vinyl toluene-maleic anhydride copolymer (SVT-MA).

Unfortunately, SSMA and SVT-MA have not always been commercially available in sufficient quantities for oil field operations. As a result, it has been difficult to obtain sufficient quantities of SSMA and SVT-MA to satisfy the demand for dispersants in spacer fluid compositions. Accordingly, a continuing search has been directed to the discovery of additional dispersant materials which can be used to produce effective spacer fluids. As previously noted drilling fluids and cement slurries are incompatible fluids and few dispersant materials are effective to disperse mixtures of the two.

SUMMARY OF THE INVENTION

According to the present invention it has now been found that spacer fluid compositions comprising a dispersant selected from the group consisting of water soluble polymers comprising allyloxybenzene sulfonate or allyloxybenzene phosphonate polymerized with at least one of acrylic acid, acrylamides, alkyl acrylamides, maleic anhydride, itaconic acid, sulfonated or phosphonated styrene, sulfonated or phosphonated vinyl toluene, sulfonated or phosphonated isobutylene, acrylamidopropane sulfonate or acrylamidopropanephosphonate, vinyl alcohol, sulfonated or phosphonated propene and alkali metal, alkaline earth metal and ammonium salts thereof and water are effective as a spacer fluid interposed between a drilling fluid and a cement slurry. The spacer fluids are effective as a buffer between the drilling fluid and the cement slurry, as a flushing agent to remove the drilling fluid from the wellbore, to clean residual drilling fluid and drilling fluid solids from the annulus between a casing and a wellbore and to disperse both drilling fluid and cementious slurry. The spacer fluids of the present invention further comprise the dispersant and water plus one or more additional compounds selected from surfactants, viscosifiers and wetting materials to form a rheologically compatible fluid for use between the drilling fluid and the cementitious slurry.

The present invention further comprises a method for displacing a drilling fluid from a wellbore space occupied by the drilling fluid with a settable cement slurry composition by the use of a spacer fluid comprising a dispersant selected from the group consisting of water soluble polymers comprising allyloxybenzene sulfonate or allyloxybenzene phosphonate polymerized with at least one of acrylic acid, acrylamides, alkyl acrylamides, maleic anhydride, itaconic acid, sulfonated or phosphonated styrene, sulfonated or phosphonated vinyl toluene, sulfonated or phosphonated isobutylene, acrylamidopropane sulfonate or acrylamidopropanephosphonate, vinyl alcohol, sulfonated or phosphonated propene and alkali metal, alkaline earth metal and ammonium salts thereof and water between the drilling fluid and the settable cement slurry composition.

DESCRIPTION OF THE PREFERRED EMBODIMENTS

Figure 1:
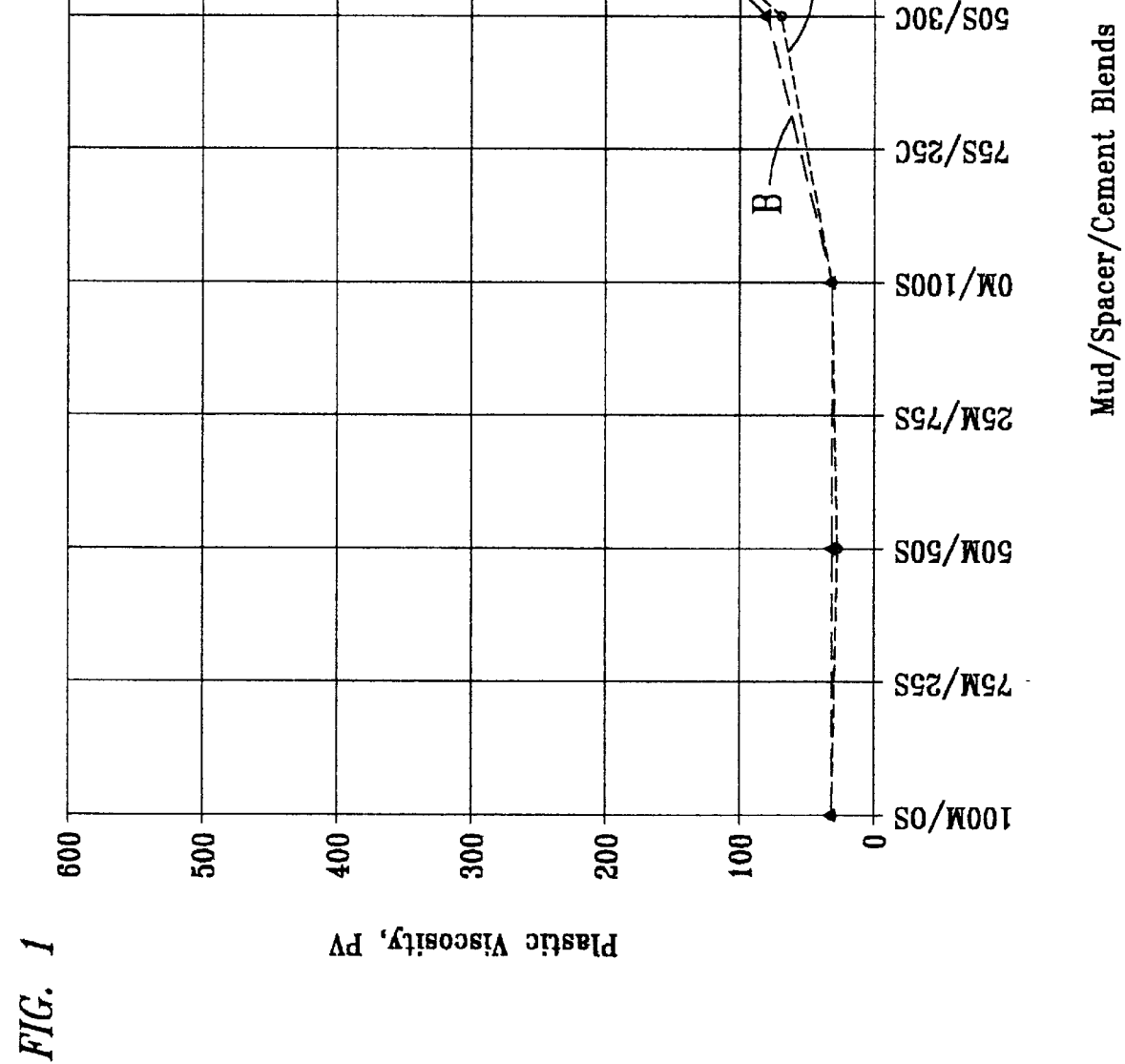
FIG. 1 is a graph showing the plastic viscosity for blends of a drilling fluid, a cement slurry and a spacer fluid containing dispersants as disclosed in Example 3.

The process of cementing an annular space in a wellbore typically comprises the displacement of drilling fluid from the annular space with a spacer fluid or pre-flushing medium which will further assure the displacement or removal of the drilling fluid and enhance the bonding of the cement to the wellbore surfaces and the casing. Drilling fluid may be displaced from the wellbore by first pumping into the wellbore a spacer fluid according to the present invention to displace the drilling fluid with the spacer fluid then being displaced by a cement slurry or by a drilling fluid which has been converted to a cement slurry as shown for instance in U.S. Pat. No. 4,883,125, "Oil and Gas Cementing Wells Using Converted Drilling Fluid", issued Nov. 28, 1989 to Wilson et al which is hereby incorporated in its entirety by reference.

It has been discovered that dispersants selected from the group consisting of water soluble polymers comprising allyloxybenzene sulfonate or allyloxybenzene phosphonate polymerized with at least one of acrylic acid, acrylamides, alkyl acrylamides, maleic anhydride, itaconic acid, sulfonated or phosphonated styrene, sulfonated or phosphonated vinyl toluene, sulfonated or phosphonated isobutylene, acrylamidopropane sulfonate or acrylamidopropanephosphonate, vinyl alcohol, sulfonated or phosphonated propene and alkali metal, alkaline earth metal and ammonium salts thereof are effective in spacer fluids to provide compatibility between the spacer fluid and a drilling fluid and a cement slurry. Such dispersants may be produced as disclosed in U.S. Pat. No. 4,892,898 "Water Soluble Polymers Containing Allyloxybenzene Sulfonate Monomers" issued Jan. 9, 1990 to Leighton et al. This patent is hereby incorporated in its entirety by reference. Such dispersants when included in spacer fluids function to disperse drilling fluids, cement slurries and mixtures of drilling fluid and cement slurry into the spacer fluid. Such dispersants are available from ALCO Chemical, a division of National Starch and Chemical Company, 909 Mueller Drive, P.O. Box 5401, Chattanooga, Tenn. 37406. Four suitable dispersants are marketed by ALCO Chemical under the trademarks AQUATREAT AR-540 (liquid), AQUATREAT AR-540-D (liquid), AQUATREAT MPS, (liquid), EXP 2289 (liquid) and Nacryl 90 (liquid). It is believed that the liquid products marketed under the trademarks AQUATREAT MPS, EXP 2289 and Nacryl 90 can be spray-dried to form powders. These products have been found to be extremely effective as dispersants in spacer fluid compositions. Of these dispersants, interpolymers of acrylic acid, allyloxybenzenesulfonate, allyl sulfonate and a non-ionic monomer marketed under the trademarks AQUATREAT AR-540 and AQUATREAT AR-540-D are preferred. These materials are not new per se and may be produced by well-known processes.

According to a first embodiment of the present invention, the spacer fluid comprises a dispersant of the present invention and water. Preferably the spacer fluid comprises from about 1.0 to about 10.0 pounds of the dispersant per 42 gallon barrel of spacer fluid. The spacer fluid may also include other conventional cement property modifiers as known to those skilled in the art such as surfactants, retarders, accelerators, viscosifiers, densifiers, fluid loss additives and silica flour. Spacer fluids which contain no viscosifiers or densifiers are sometimes referred to as pre-flush fluids.

The spacer fluid according to this first embodiment could be advantageously used in cement procedures conducted in remote locations since it contains a relatively limited number of separate components.

According to a second embodiment of the present invention the spacer fluid comprises: 1) the dispersant for promoting compatibility between the drilling fluid being displaced and the cement slurry following the spacer fluid; 2) a densifier such as barite, hematite or a cementitious material to densify the spacer fluid and provide the spacer fluid with weighting and cementitious properties and 3) one or more viscosifiers selected from welan gum, xanthan gum, hydroxyethylcellulose (HEC), carboxymethylhydroxyethyl cellulose (CMHEC), attapulqite, partially hydrolyzed polyacrylamide (PHPA), sepiolite, bentonite, acrylimide, acrylic acid, 2-acrylamido-2-methylpropane sulfonic acid (AMPS) copolymers, polyvinylpyrrolidone (PVP), silicate-extenders and drilling fluid from the active mud system or mixtures thereof.

The spacer fluid according to the second embodiment may include other conventional cement property modifiers known to those skilled in the art such as surfactants, retarders, dispersants, accelerators, viscosifiers, densifiers, fluid loss additives, and silica flour.

Welan gum is a polymer made by an Alcaligenes bacteria identified as S-130. The chemical structure of welan gum is disclosed in U.S. Pat. No. 4,342,866, the disclosure of which is hereby incorporated in its entirety by reference. The gum is a pseudoplastic, high efficiency viscosifier that is tolerant to salt and calcium and is more compatible with cementitious slurries than conventional viscosifiers. The gum also imparts substantial fluid loss control. Further, welan gum maintains a stable yield point across a broad temperature range for improved solids suspension. Welan gum is commercially available under the trademark BIOZAN® from Kelco, Inc.

In addition to the cementitious materials, the spacer fluid according to the second embodiment may alternatively or in addition include other conventional weighting materials such as barite, hematite or the like to obtain a desired density range in the spacer fluid.

The spacer fluid composition according to the second embodiment as described above provides a buffer zone between the drilling fluid being displaced and the conventional cement slurry following the spacer fluid, enhances the bonding between the conventional cement slurry and the surfaces of the wellbore and the casing, and sets to provide casing support and corrosion protection. In other words, the spacer fluid composition according to the second embodiment may function as a portion of the cement slurry used to maintain the casing in place in the wellbore.

According to a third embodiment of the present invention, the spacer fluid may comprise in combination with water, the dispersant and optionally at least one anionic or nonionic water wetting surfactant and optionally at least one viscosifying material such as welan gum, xanthan gum, HEC, CMHEC, PHPA, bentonite, attapulgite, sepiolite and sodium silicate and optionally at least one weighting material such as barite, hematite, illmenite, sand and the like to form a rheologically compatible medium for displacing fluid from the wellbore. Suitable anionic surfactants are surfactants such as alkylarylsulfonates and the like.

Suitable nonionic surfactants are selected from materials such as sugar lipids, ethoxylated alcohols, ethoxylated nonyphenols and the like.

According to a fourth embodiment of the present invention, the spacer fluid comprises the dispersant, bentonite, welan gum, surfactant and a weighting agent. Preferably the spacer fluid, according to the fourth embodiment of the present invention, comprises a spacer fluid dry mix which includes: 1) 10 to 50% by weight of the dispersant; 2) 40 to 90% by weight of bentonite as a suspending agent; and 3) 1 to 20% by weight of welan gum or a combination of welan gum and HEC fluid as a pseudoplastic, high efficiency viscosifier tolerant to salt and calcium. The spacer fluid may also comprise 4) from about 0.01 to about 10.0 gallons per barrel of aqueous base spacer of a non-ionic surfactant such as sugar lipids, ethoxylated alcohol, ethoxylated nonylphenol and the like, and, 5) conventional weighting agents such as barite, hematite and calcium carbonate to provide the desired density. It is preferred that the weighting agent be added to the spacer fluid in an amount to give the spacer fluid a density at least equal to or greater than the density of the drilling fluid and less than or equal to the density of the cement slurry.

The spacer fluids produced using the spacer fluid dry mix of the fourth embodiment are quite, compatible with conventional drilling fluids, cement slurries and mixtures of drilling fluid and cement slurries. The inclusion of the dispersant provides good temperature stability to the spacer fluid so that it has a broad temperature range of applicability. The spacer fluids of the fourth embodiment also have the following advantageous properties. The dispersant serves to provide enhanced compatibility between drilling fluids and cement slurries and as a stabilizer for bentonite at high temperatures. The polymeric viscosifiers work in concert with the bentonite to provide the spacer fluid with the capability of maintaining acceptable suspension characteristics and fluid loss properties over a broad range of temperatures. At high temperatures the bentonite undergoes controlled flocculation to provide long term suspension capability as the welan gum degrades in performance due to the high temperatures. The primary function of the surfactant is as a water wetting agent to provide a more acceptable surface for cement bonding after exposure to water or oil base fluids and to provide spacer compatibility with water or oil base drilling fluids. The surfactant can also be selected to enhance the gel structure formed by the bentonite or the welan gum.

The spacer fluid of the fourth embodiment results in improved primary cementing which provides external casing corrosion protection and facilitates selective stimulation of formations penetrated by the wellbore and zonal isolation of producing formations thereby improving the water-oil ratio of produced fluids.

The spacer fluids according to the fourth embodiment act as an effective buffer between the drilling fluid and the cement slurry, promote good hole cleaning, disperse mixtures of wellbore fluids to ensure compatibility, and leave the casing and formation surfaces water-wet to improve cement bonding.

The spacer fluids of the fourth embodiment may also include potassium chloride, sodium chloride, calcium chloride, magnesium chloride, quaternary ammonium salts, zirconium oxy chlorides and other materials known to those skilled in the art to inhibit the swelling of formation clays thereby preventing formation damage. In such cases, the spacer fluid preferably comprises from about 3 to about 5 weight percent potassium chloride. The inclusion of potassium chloride in the spacer fluid makes the spacer fluid especially suitable for use in wells that are known to experience formation damage from fresh water in the wellbore annulus.

Sugar lipids, ethoxylated alcohols, ethoxylated nonylphenol surfactants and the like are preferred nonionic surfactants for use with the spacer fluids of the present invention. Such surfactants comprise both a hydrophobic component and a hydrophilic component. For example, in a completed water based spacer fluid produced from the spacer fluid dry mix discussed above, from about 0.1 to about 10.0 gallons of a non-ionic surfactant, such as an ethoxylated nonylphenol surfactant containing 23% ethylene oxide and having a mole ratio of ethylene oxide per mole of nonylphenol of 1.5, is added per barrel of spacer fluid.

To produce a spacer fluid for use with an oil based drilling fluid from the compositions discussed above, from about 1.0 to about 10 gallons of a non-ionic surfactant, such as an ethoxylated nonylphenol surfactant containing 65 weight percent ethylene oxide and having a mole ratio of ethylene oxide per mole of nonylphenol of 9, is added per barrel of spacer fluid.

As discussed previously potassium chloride may typically be added to the spacer fluids on an as needed basis to inhibit formation clay swelling and the like. Further, the addition of potassium chloride will increase the low temperature viscosity of the spacer fluid.

EXAMPLE 1

A lignite mud drilling fluid composition having a density of 11 pounds per gallon and a pH of 10.5 was tested with various dispersants to determine the yield point and the plastic viscosity in pounds per hundred feet squared. The tests were conducted with a CHAN model 35 viscometer using a #1 bob and sleeve and a #1 spring. The CHAN viscometer used a rotor and a bob which is attached to a spring to measure the stress factor in a fluid. The bob and rotor are immersed in the test fluid which is contained in a stationary test cup. The rotor is arranged in concentric alignment with the bob and causes the fluid to move at various shear rates, while the bob by means of the attached spring, measures the torque exerted on the bob. The drilling fluid (lignite mud) tested contained 294 grams of water, 15 grams of bentonite, 12.5 grams of seasalt, 0.03 grams of a biocide, 6 grams of lignite, 0.5 grams of low-viscosity carboxymethylcellulose, 45 grams of calcined calcium montmorillite, 10 grams of bentonite and 79.5 grams of barite. These materials had a total weight of 462.8 grams and represent 350 cc's (cubic centimeters) of lignite mud. This volume of lignite mud is considered to be equivalent to one laboratory barrel of lignite mud.

This lignite mud was tested with various dispersants as shown in Table 1. In the tests 300 grams of class H Portland cement was mixed with 1.0 lab barrel of the lignite mud and the dispersants shown in Table 1. The mixtures were tested to determine their-plastic viscosity and yield points. In Table 1 the plastic viscosity and yield points of the mixtures of drilling fluid and cement with the selected dispersants is shown at room temperature (80° F.) and 190° F.

TABLE 1

| Dispersant | Addition Rate lb/bbl | Plastic Viscosity 80° F. | Plastic Viscosity @ 190° F. | Yield Point 80° F. | Yield Point @ 190° F. |
|---|---|---|---|---|---|
| None | Will not mix | Will not mix | Will not mix | Will not mix | Will not mix |
| SVT-MA | 3 | 67 | 24 | 28 | 6 |
| AQUA-TREAT* AR-540-D | 3 | 71 | 28 | 9 | −1 |
| Nacryl 90* | 3 | 73 | 26 | 10 | 1 |

TABLE 1-continued

| Dispersant | Addition Rate lb/bbl | Plastic Viscosity 80° F. | Plastic Viscosity @ 190° F. | Yield Point 80° F. | Yield Point @ 190° F. |
|---|---|---|---|---|---|
| EXP 2289* | 3 | 73 | 27 | 8 | −1 |
| AQUA-TREAT* MPS | 3 | 64 | 26 | 10 | 1 |
| Cement Dispersant A | 3 | Will not mix | Will not mix | Will not mix | Will not mix |
| Cement Dispersant A | 6 | Will not mix | Will not mix | Will not mix | Will not mix |
| Drilling Fluid Dispersant B | 3 | Will not mix | Will not mix | Will not mix | Will not mix |
| Drilling Fluid Dispersant B | 10 | Will not mix | Will not mix | Will not mix | Will not mix |

*Trademarks of ALCO Chemical, a division of National Starch and Chemical Company, 909 Mueller Drive, P.O. Box 5401, Chattanooga, Tennessee, 37406.

Please note that with no dispersant the materials will not mix. Similar results are obtained with cement dispersant A (sulfonated acetone condensed with formaldehyde) which is a commercially available dispersant for use in cement slurries. Drilling fluid dispersant B is chrome lignosulfonate.

With SVT-MA good plastic viscosity is obtained at both temperatures and good yield points are obtained at both temperatures.

With each of the other four dispersants tested, desirable results were also obtained. Lower values are more desirable for both the plastic viscosity and the yield point. The very low values for the yield point for the other dispersants indicate that less of the other dispersants could be used to achieve suitable plastic viscosity and yield point levels. These tests clearly show that the other dispersants when used in equal quantities are equal to or better than SVT-MA as a dispersant with drilling fluids and with Portland cement which is considered representative of cementitious materials generally.

EXAMPLE 2

Similar tests were conducted with the same lignite mud in combination with ground blast furnace slag which was added to the mixture at the rate of 300 pounds of slag per barrel of lignite mud.

The tests were conducted according to the same procedure discussed above with the mixture of blast furnace slag, which is a well-known cementitious material, in mixture with the lignite mud. The same dispersant materials were tested and the test results are shown below in Table 2.

TABLE 2

| Dispersant | Addition Rate lb/bbl | Plastic Viscosity 80° F. | Plastic Viscosity @ 190° F. | Yield Point 80° F. | Yield Point @ 190° F. |
|---|---|---|---|---|---|
| None | Will not mix | Will not mix | Will not mix | Will not mix | Will not mix |
| SVT-MA* | 3 | 90 | 41 | 77 | 10 |
| AQUA-TREAT* AR-540-D | 3 | 102 | 43 | 73 | 2 |
| Nacryl 90* | 3 | 90 | 36 | 73 | 7 |
| EXP 2289* | 3 | 104 | 43 | 75 | 3 |
| AQUA-TREAT* MPS | 3 | 102 | 39 | 66 | 6 |

TABLE 2-continued

| Dispersant | Addition Rate lb/bbl | Plastic Viscosity 80° F. | Plastic Viscosity @ 190° F. | Yield Point 80° F. | Yield Point @ 190° F. |
|---|---|---|---|---|---|
| Cement Dispersant A | 3 | Will not mix | Will not mix | Will not mix | Will not mix |
| Cement Dispersant A | 6 | Will not mix | Will not mix | Will not mix | Will not mix |
| Drilling Fluid Dispersant B | 3 | Will not mix | Will not mix | Will not mix | Will not mix |
| Drilling Fluid Dispersant B | 10 | Will not mix | Will not mix | Will not mix | Will not mix |

*Trademarks of ALCO Chemical, a division of National Starch and Chemical Company, 909 Mueller Drive, P.O. Box 5401, Chattanooga, Tennessee, 37406.

The dispersants of the present invention have equal or better dispersant properties than SVT-MA in the tests shown in Table 2. Again the very low yield points especially at 190° F. indicate that a lesser amount of the dispersants of the present invention may be sufficient.

As demonstrated above, the dispersants are effective to disperse mixtures of drilling fluids and cementitious mixtures. Accordingly, these materials are effective in spacer fluids to act as a buffer between the drilling fluids and the cementitious slurries. Further, since the dispersants are effective to disperse drilling fluids, they are effective to remove drilling fluid solids from the wellbore walls when used in suitable spacer fluid compositions as discussed above.

EXAMPLE 3

Figure 2:
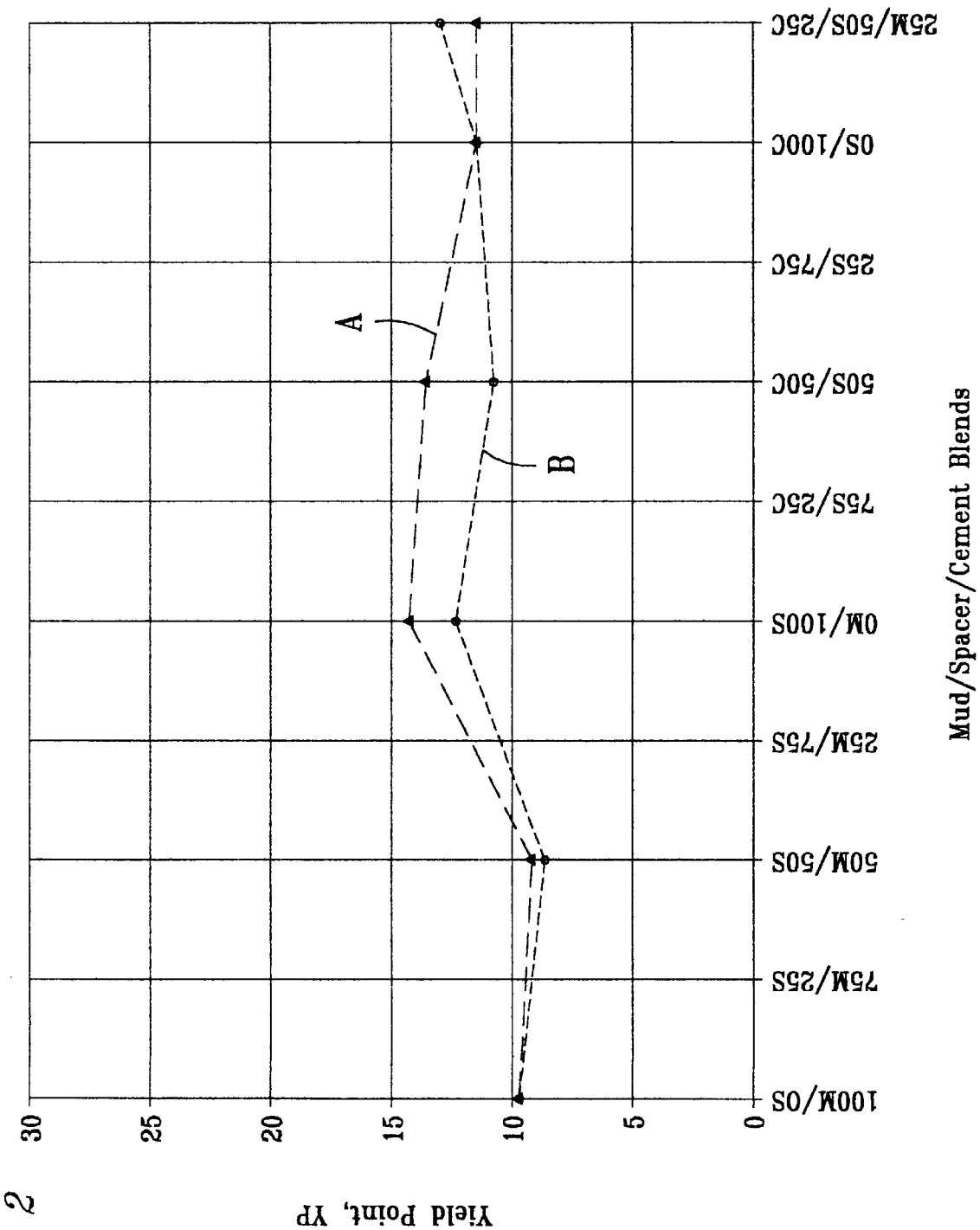
FIG. 2 is a graph showing the yield points for blends of a drilling fluid, a cement slurry and a spacer fluid containing dispersants as disclosed in Example 3.

Further tests were conducted using the same tests for plastic viscosity and yield point at 180° F. to demonstrate the compatibility of a spacer fluid containing AQUATREAT AR-540-D dispersant with drilling fluid and a cement slurry. The spacer fluid, drilling fluid and cement slurry were mixed in various proportions and the plastic viscosity and yield point determined for each mixture. The plastic viscosities are shown in FIG. 1 and the yield points are shown in FIG. 2. The proportions of the materials are shown as 75M/25S to indicate 75 weight percent drilling mud mixed with 25 weight percent spacer fluid. 25M/50S/25C designates a mixture containing 25 weight percent drilling fluid, 50 weight percent spacer fluid and 25 weight percent cement slurry.

The drilling fluid used was a 16.9 pounds per gallon ligno mud taken from a drilling operation. The exact composition of this drilling fluid (mud) is not known, but it is representative of commonly used drilling muds and it was used in all of the tests.

The cement slurry contained:

| a) | Class H Portland Cement | 693.5 g |
|---|---|---|
| b) | Silica Flour | 242.7 g |
| c) | Fluid Loss Additive A | 2.77 g |
| d) | Fluid Loss Additive B | 2.08 g |
| e) | Cement Dispersant A | 2.08 g |
| f) | Cement Retarder | 2.46 ml |
| g) | Water | 285.1 g |

The spacer fluid contained:

| a) | Dispersant | 2.87 g |
|---|---|---|
| b) | Welan gum | 0.365 |
| c) | Bentonite | 5.44 |
| d) | Barite | 471.1 |
| e) | Surfactant | 6.4 |
| f) | Water | 227.7 |

On both FIG. 1 and FIG. 2 line A shows results obtained using SVT-MA as a dispersant and line B shows results obtained using AQUATREAT 540-D dispersant. All tests were made at 180° F. With all blends both the yield point and the plastic viscosity is equal to or less than that of the blend component having the highest plastic viscosity or the highest yield point. It is particularly to be noted that the blend of all three components exhibits good compatability. Many cement dispersants are effective to disperse cement slurries and there are many drilling fluid dispersants which are effective to disperse drilling fluids. The cement dispersants however are not usually effective with drilling fluids and the drilling fluid dispersants are not usually effective with cement slurries. Surprisingly the spacer fluids containing the dispersants of the present invention are effective with both drilling fluids and cement slurries and with mixtures of both.

SVT-MA is known to be effective as a dispersant of this type. The AQUATREAT AR-540-D dispersant which is representative of the dispersants of the present invention is shown to be very comparable to or better than SVT-MA in the blends tested.

The cementitious materials used in cement slurries typically comprise lime, silica and alumina, lime and magnesia, silica and alumina and iron oxide, calcium sulphate, Portland cement, pozzolanic materials such as ground slag, fly ash and the like.

Having described the present invention by reference to certain of its preferred embodiments, it is respectfully noted that the embodiments discussed are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, we claim:

1. A rheologically compatible spacer fluid for use between a drilling fluid and a cement slurry consisting essentially of:
   a) about 1.0 to about 10.0 pounds per barrel of spacer fluid of a dispersant selected from the group consisting of water soluble polymers of allyloxybenzenesulfonate or allyloxybenzenephosphonate polymerized with at least one of acrylic acid, acrylamides, alkyl acrylamides, maleic anhydride, itaconic acid, sulfonated or phosphonated styrene, sulfonated or phosphonated vinyl toluene, sulfonated or phosphonated isobutylene, acrylamidopropane sulfonate or acrylamidopropanephosphonate, vinyl alcohol, sulfonated or phosphonated propene and alkali metal, alkaline earth metal and ammonium salts thereof; and;
   b) water.

2. A rheologically compatible spacer fluid consisting essentially of:
   a) A dispersant selected from the group consisting of water soluble polymers of allyloxybenzenesulfonate or allyloxybenzenephosphonate polymerized with at least one of acrylic acid, acrylamides, alkyl acrylamides, maleic anhydride, itaconic acid, sulfonated or phosphonated styrene, sulfonated or phosphonated vinyl toluene, sulfonated or phosphonated isobutylene, acrylamidopropane sulfonate or acrylamidopropanephosphonate, vinyl alcohol, sulfonated or phosphonated propene and alkali metal, alkaline earth metal and ammonium salts thereof, b) water;

c) a cementitious material d) a viscosifier.

3. The spacer fluid of claim 2 wherein the spacer fluid further includes at least one cement property modifier selected from the group consisting of nonionic water wetting surfactants, anionic water wetting surfactants, retarders, dispersants, densifiers, fluid loss additives, and silica flour.

4. The spacer fluid of claim 2 wherein the spacer fluid further includes a weighting material selected from the group consisting of barite and hematite.

5. The spacer fluid of claim 2 wherein the spacer fluid contains from about 1.0 to about 10 pounds of the dispersant per barrel of spacer fluid.

6. The spacer fluid of claim 2 wherein the viscosifier is selected from the group consisting of welan gum, xanthan gum, hydroxyethyl cellulose, carboxymethylhydroxyethyl cellulose, attapulgite, partially hydrolyzed polyacrylamide: sepiolite, bentonite, acrylamide, acrylic acid 2-acrylamido-2-methylpropane sulfonic acid copolymers, polyvinylpyrrolidone and silicate extenders.

7. The spacer fluid of claim 1 wherein the spacer fluid composition further includes a nonionic surfactant or an anionic surfactant.

8. A rheologically compatible spacer fluid consisting essentially of:

a) a dispersant selected from the group consisting of water soluble polymers of allyloxybenzenesulfonate or allyloxybenzenephosphonate polymerized with at least one of acrylic acid, acrylamides, alkyl acrylamides, maleic anhydride, itaconic acid, sulfonated or phosphonated styrene, sulfonated or phosphonated vinyl toluene, sulfonated or phosphonated isobutylene, acrylamidopropane sulfonate or acrylamidopropanephosphonate, vinyl alcohol, sulfonated or phosphonated propene and alkali metal, alkaline earth metal and ammonium salts thereof;

b) water: and c) a viscosifier.

9. The spacer fluid of claim 8 wherein the spacer fluid further includes at least one weighting material selected from the group consisting of barite, hematite, illmenite, calcium carbonate and sand.

10. The spacer fluid of claim 8 wherein the spacer fluid further includes at least one nonionic surfactant selected from the group consisting of sugar lipids, ethoxylated alcohols, nonylphenols and mixtures thereof.

11. The spacer fluid of claim 2 wherein the cementitious material is selected from the group consisting of lime, silica and alumina, lime and magnesia, silica and alumina and iron oxide, calcium sulphate, Portland cement, ground slag, fly ash and mixtures thereof.

12. A method for displacing a drilling fluid from a wellbore space occupied by the drilling fluid with a settable cement composition, the method consisting essentially of:

a) displacing the drilling fluid with a spacer fluid consisting essentially of a dispersant selected from the group consisting of water soluble polymers of allyloxybenzenesulfonate or allyloxybenzenephosphonate polymerized with at least one of acrylic acid, acrylamides, alkyl acrylamides, maleic anhydride, itaconic acid, sulfonated or phosphonated styrene, sulfonated or phosphonated vinyl toluene, sulfonated or phosphonated isobutylene, acrylamidopropane sulfonate or acrylamidopropanephosphonate, vinyl alcohol, sulfonated or phosphonated propene and alkali metal, alkaline earth metal and ammonium salts thereof and water; and b) displacing at least a portion of the spacer fluid with the settable cement composition.

13. The method of claim 12 wherein the spacer fluid contains from about 1.0 to about 10.0 pounds of the dispersant per barrel of spacer fluid.

14. The method of claim 12 wherein the spacer fluid further includes:

c) a cementitious material; and d) a viscosifier selected from the group consisting of welan gum, xanthan gum, hydroxyethyl cellulose, carboxymethylhydroxyethyl cellulose, attapulgite, partially hydrolyzed polyacrylamide; sepiolite, bentonite, acrylamide, acrylic acid, 2-acrylamido-2-methylpropane sulfonic acid copolymers, polyvinylpyrrolidone, and silicate extenders.

15. The method of claim 14 wherein the spacer fluid further includes at least one cement property modifier selected from the group consisting of nonionic water wetting surfactants, anionic water wetting surfactants, retarders, dispersants, densifiers, fluid loss additives, and silica flour.

16. The spacer fluid of claim 14 wherein the spacer fluid further includes a weighting material selected from the group consisting of barite and hematite.

17. The spacer fluid of claim 14 wherein the spacer fluid contains from about 1.0 to about 10 pounds of the dispersant per barrel of spacer fluid.

18. The method of claim 12 wherein the spacer fluid further includes at least one of an anionic surfactant and a nonionic surfactant.

19. The spacer fluid of claim 1 wherein the spacer fluid includes a viscosifier selected from the group consisting of welan gum, hydroxyethylcellulose, carboxymethylhydroxyethyl cellulose, partially hydrolyzed polyacrylamide, bentonite, attapulgite, sepiolite and sodium silicate.

20. The spacer fluid of claim 1 wherein the spacer fluid includes at least one weighting material selected from the group consisting of barite, hematite, illmenite, calcium carbonate and sand.

21. The method of claim 14 wherein the cementitious material is selected from the group consisting of lime, silica and alumina, lime and magnesia, silica and alumina and iron oxide, calcium sulphate, Portland cement, ground slag, fly ash and mixtures thereof.

22. The spacer fluid of claim 8 wherein the viscosifier is selected from the group consisting of welan gum, xanthan gum, hydroxyethyl cellulose, carboxymethylhydroxyethyl cellulose, attapulgite, partially hydrolyzed polyacrylamide; sepiolite, bentonite, acrylamide, acrylic acid, 2-acrylamido-2-methylpropene sulfonic acid copolymers, polyvinylpyrrolidone and silicate extenders.

* * * * *